(12) United States Patent
Mitsunaga

(10) Patent No.: US 6,667,613 B1
(45) Date of Patent: Dec. 23, 2003

(54) METHOD OF MEASURING RESISTANCE OF MAGNETORESISTIVE ELEMENT

(75) Inventor: Nobuyuki Mitsunaga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 98 days.

(21) Appl. No.: 09/661,759

(22) Filed: Sep. 14, 2000

(30) Foreign Application Priority Data

Dec. 20, 1999 (JP) .......................................... 11-360353

(51) Int. Cl.$^7$ .............................................. H01L 43/08
(52) U.S. Cl. .................. 324/207.21; 324/252
(58) Field of Search ...................... 324/549, 210–219, 324/207.21, 228, 252; 360/313, 328, 131, 137, 61–68, 46

(56) References Cited

U.S. PATENT DOCUMENTS 5,696,445 A * 12/1997 Inbar ........................ 324/228
5,774,291 A * 6/1998 Contreras et al. ............. 360/67

FOREIGN PATENT DOCUMENTS

JP 3-260901 11/1991
JP 8-055314 2/1996

* cited by examiner

*Primary Examiner*—N. Le
*Assistant Examiner*—Amy He
(74) *Attorney, Agent, or Firm*—Greer, Burns & Crain, Ltd.

(57) ABSTRACT

An amplifier amplifies a potential difference appearing at sense channels. A resistor of a given resistance value and a magnetoresistive element are connected to the amplifier. First and second inspection currents of difference values are supplied to the resistor. The amplifier thus outputs a first and second voltages. The amplification characteristic or gain of the amplifier can be calculated based on the measured first and second voltages, the values of the inspection currents and the resistance of the resistor. A third inspection current is then supplied to the magnetoresistive element. The output voltage is likewise measured. The value of the third inspection current and the value of the measured output voltage in addition to the amplification characteristic enable a highly accurate determination of the value corresponding to the effective resistance of the magnetoresistive element.

5 Claims, 4 Drawing Sheets

METHOD OF MEASURING RESISTANCE OF MAGNETORESISTIVE ELEMENT

BACKGROUND OF THE INVENTION

1. Field of the Invention

The present invention relates to a method of measuring a resistance of a magnetoresistive (MR) element such as a read head employed in a magnetic recording medium drive including a hard disk drive (HDD), for example.

2. Description of the Prior Art

In general, a magnetoresistive (MR) head element has the maximum permissible magnitude of a supplied electric current. The maximum permissible magnitude can be determined depending on the magnitude of the resistivity of the MR head element. If an electric current of a magnitude beyond the maximum permissible magnitude is supplied to the MR head element, the lifetime of the MR head element is remarkably shortened. Accordingly, the MR head element is only allowed to receive a sense or bias current of a magnitude below the maximum permissible magnitude.

When the maximum permissible magnitude of an electric current should be specified for MR head elements, the resistance is estimated for the individual MR head elements. The resistance can be estimated based on the value of an inspection current supplied to an MR head element and the potential difference or voltage appearing at opposite terminals of the MR head element in response to supply of the inspection current. The value of the inspection current may be set at a predetermined level at a current source for the inspection current. The potential difference or voltage can be read as the output of the MR head element when the MR head element receives the inspection current.

If the estimated resistance is actually smaller than the true or effective resistance of the MR head element, the calculated maximum permissible magnitude of an electric current is specified as a magnitude larger than the true maximum permissible magnitude. If the sense current is set based on the thus incorrect maximum permissible magnitude, the MR head element should suffer from a shortened lifetime. Heretofore, the resistance of an MR head element cannot be measured at a higher accuracy. A predetermined margin is added to the calculated maximum permissible magnitude in view of the extent of such an error, when the magnitude of a sense or bias current should be determined. The set magnitude of the sense current sometimes largely deviates from the true maximum permissible magnitude.

It is a trend in the technical field of magnetic recording media such as magnetic disks to increase or improve the recording density. A higher linear density along recording tracks induces reduction in the magnitude of the output signal from the MR head element. A larger sense current is required to still enlarge the magnitude of the output signal. If the sense current is too small, the signal/noise (S/N) ratio is supposed to get deteriorated in the output from the MR head element, so that a binary data recorded on the medium cannot correctly be decoded into its original information data. Measurement of the resistance at a higher accuracy may serve to cancel the deviation between the calculated maximum permissible magnitude and the true maximum permissible magnitude for an electric current. The magnitude of a sense current can be maximized within the range below the true maximum permissible magnitude of an electric current.

SUMMARY OF THE INVENTION

It is accordingly an object of the present invention to provide a method of measuring the resistance of a magnetoresistive (MR) element at a higher accuracy.

According to a first aspect of the present invention, there is provided a method of measuring the resistance of an MR element, comprising determining the amplification characteristic of an amplifier designed to amplify the potential difference appearing at a sense channel prior to calculation of the value corresponding to the resistance of the MR element connected to the sense channel.

In general, the potential difference or voltage appearing at terminals of the MR element is detected after amplification at an amplifier. It is impossible to set the amplification characteristic or gain at a higher accuracy in the amplifier designed to amplify a smaller and weaker potential difference or voltage. The effective gain of the amplifier slightly departs from the ideal gain actually expected. The determination of the resistance based on the actual measurement of the amplification characteristic leads to calculation of the value corresponding to the resistance of the MR element at a higher accuracy.

According to a second aspect of the present invention, there is provided a method of measuring the resistance of an MR element, comprising: supplying an inspection current to a resistor connected to a sense channel; measuring the value of an output voltage from an amplifier designed to amplify the potential difference appearing at the sense channel in response to supply of the inspection current; and calculating the amplification characteristic of the amplifier based on the value of the output voltage and the value of the inspection current.

In general, the amplification characteristic or gain of an amplifier may be specified by the ratio of the output voltage to the input voltage. The value of the input voltage can be obtained by calculation based on the values of the resistance of the resistor and the inspection current, as conventionally known. On the other hand, the value of the output voltage can be measured. Based on the calculated input voltage and the measured output voltage, it is possible to obtain the amplification characteristic or gain of the amplifier in a facilitated manner.

In addition, the effective resistance can be set in a resistor, such as a wire-wound resistor, at a higher accuracy. The resistor usually exhibits the effective resistance of the value similar to the indicated value of the specifications. It is accordingly possible to determine the effective resistance of the resistor at a higher accuracy without actual measurement or inspection. The indicated value of the specifications is useful enough to determine the amplification characteristic of an amplifier at a higher accuracy.

When the effective resistance of an MR element is to be measured, an inspection current may be supplied to the MR element connected to the aforementioned amplifier through a sense channel. In this case, the value is measured for a voltage output from the amplifier based on supply of the inspection current. The values of the inspection current and the measured output voltage in addition to the amplification characteristic or gain enables a highly accurate determination of the value corresponding to the resistance of the MR element. Without measurement of the gain for the individual amplifier, it is impossible to determine the resistance of the MR element at a higher accuracy.

Furthermore, according to a third aspect of the present invention, there is provided a method of measuring the resistance of an MR element, comprising: supplying a first inspection current of a first value to a resistor connected to a sense channel; measuring a first value of an output voltage from an amplifier designed to amplify the potential difference appearing at the sense channel in response to supply of the first inspection current; supplying a second inspection current of a second value different from the first value to the resistor; and measuring a second value of an output voltage from the amplifier in response to supply of the second inspection current.

The potential difference or voltage expected to appear at terminals of the resistor in response to supply of the first and second inspection currents can be calculated based on the value corresponding to the resistance of the resistor as well as the first and second values of the inspection currents. The amplification characteristic or gain of the amplifier can be calculated in a facilitated manner based on the potential difference appearing at the resistor and the measured first and second values of the outputs from the amplifier. In addition, employment of the resistor enables a highly accurate measurement of the amplification characteristic or gain for the amplifier, in the aforementioned manner.

When the effective resistance of an MR element is to be measured, an inspection current of a third value may be supplied to the MR element which is connected to the aforementioned amplifier through a sense channel. In this case, the value is measured for a voltage output from the amplifier based on supply of the inspection current. The third value of the inspection current and the value of the measured output voltage in addition to the amplification characteristic or gain enables a highly accurate determination of the value corresponding to the resistance of the MR element. Without measurement of the gain for the individual amplifier, it is impossible to determine the resistance of the MR element at a higher accuracy.

The method of measuring may be accomplished by a read operation controller circuit comprising: a plurality of sense channels; a resistor connected to one of the sense channels; a current source designed to output an electric current of a specified value; and a bias circuit connected to the current source and designed to appoint any of the sense channels so as to supply the electric current from the current source to said any of the sense channels.

For example, the current source may be designed to output the aforementioned first and second inspection currents of the first and second values. The first and second inspection currents can be supplied from the current source to the resistor via the bias circuit and the specific sense channel. In response to supply of the first and second inspection currents, the first and second values can be measured for the output voltage from the amplifier, respectively. The amplification characteristic or gain can be determined in accordance with the first and second values of the inspection currents and the measured first and second values of the output voltages, in the aforementioned manner.

The individual MR elements can be connected to the corresponding sense channels in the read operation controller circuit. When an inspection current is supplied to the respective sense channels, the voltage of the output from the amplifier can be measured for the individual MR elements. The obtained values of the inspection currents and the measured voltages can be employed to accurately determine the effective resistance of the respective MR elements.

Furthermore, the method of measuring may be accomplished by a magnetic recording medium drive comprising: a magnetoresistive element; a first sense channel connected to the magnetoresistive element; a resistor; a second sense channel connected to the resistor; a current source designed to output an electric current of a specified value; a bias circuit connected to the first and second sense channels so as to selectively supply the electric current from the current source to the first and second sense channels; and an amplifier connected to the first and second sense channels so as to amplify a potential difference appearing at the first and second sense channels in response to supply of the electric current from the current source.

For example, the current source may be designed to output the aforementioned first and second inspection currents of the first and second values as well as the inspection current of the third value. The first and second inspection currents can be supplied to the resistor from the bias circuit through the second sense channel. On the other hand, the inspection current of the third value can be supplied to the MR element from the bias circuit through the first sense channel. The output voltage from the respective sense channels can be measured in this manner in response to supply of the inspection currents of the first, second and third values. The amplification characteristic or gain can be determined in accordance with the first and second values of the inspection currents and the measured first and second values of the output voltages, while the effective resistance of the MR element can be determined at a higher accuracy, in the aforementioned manner.

Furthermore, the method of measuring can be achieved by the operations of a computer. In this case, a recording medium may include a computer applicable software allowing the computer to process: appointing a sense channel connected to a resistor; causing supply of a first inspection current of a first value to the sense channel; obtaining a first value of an output voltage from an amplifier designed to amplify a potential difference appearing at the sense channel in response to supply of the first inspection current; causing supply of a second inspection current of a second value different from the first value to the sense channel; obtaining a second value of an output voltage from the amplifier in response to supply of the second inspection current; and calculating an amplification characteristic of the amplifier based on a value corresponding to a resistance of the resistor, the first and second values of the first and second inspection currents and the first and second values of the output voltages. The recording medium may include a flash memory mounted on a printed circuit board, for example, a flexible disk (FD), a compact disk (CD), and the like.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
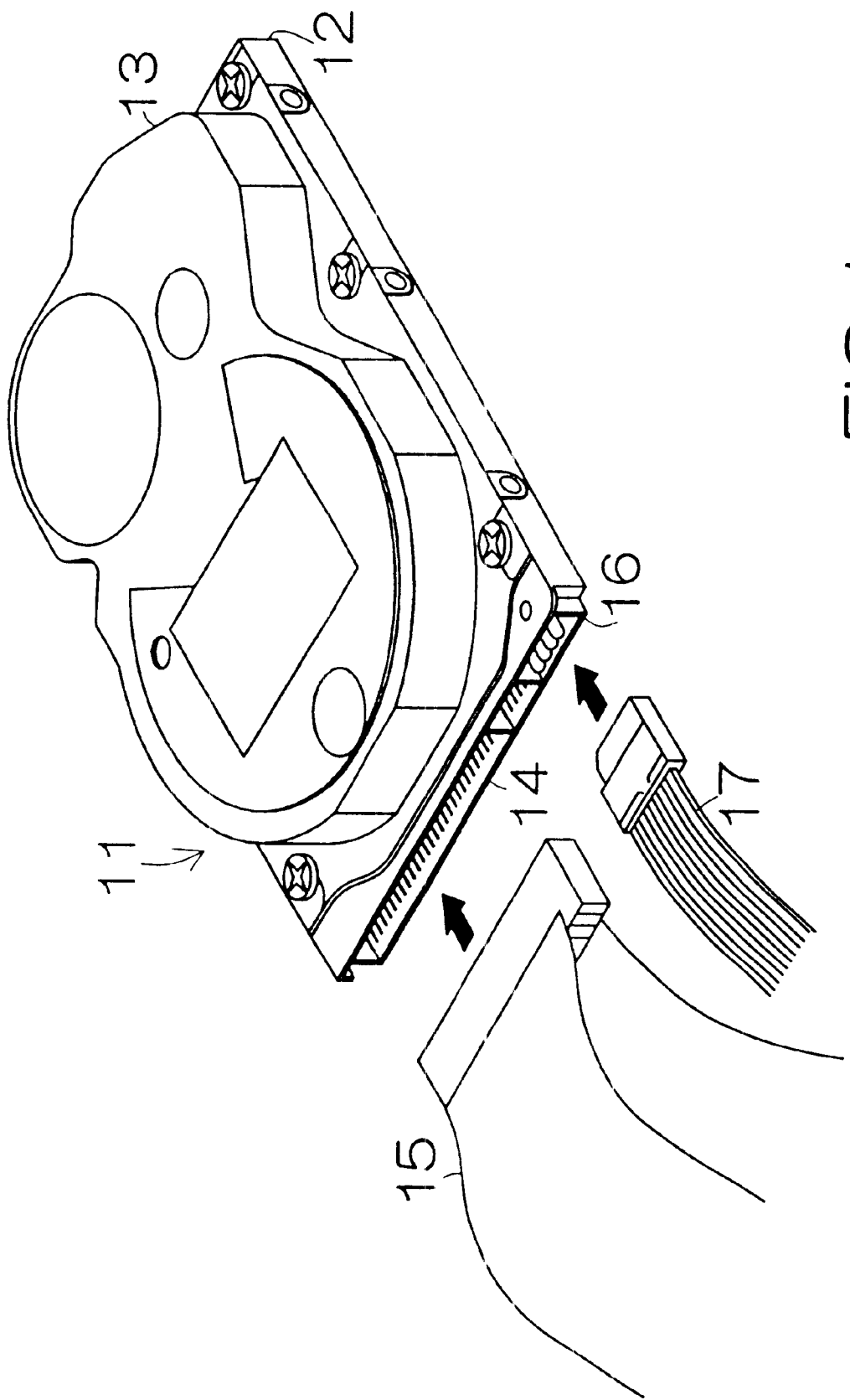
FIG. 1 is a perspective view illustrating the exterior structure of a hard disk drive (HDD) as an example of a recording medium drive.

FIG. 1 schematically illustrates the structure of a hard disk drive (HDD) 11 as an example of a magnetic recording medium drive. The HDD 11 comprises a plate-shaped base 12 and an enclosure body 13 received on the planar up-faced surface of the base 12. When the enclosure body 13 is coupled to the base 12, an enclosure space is defined between the enclosure body 13 and the base 12. The base 12 can be formed by casting, while the enclosure body 13 can be formed by deep-drawing, for example. The HDD 11 may be assembled within a housing, not shown, of a computer such as a workstation and a personal computer, or may be constructed as an external storage device independent of such a computer.

A printed circuit board, not shown, is attached to the rear surface of the base 12. An HDD controller circuit is constructed on the surface of the printed circuit board so as to control the operation of the HDD 11, as described later in detail. The HDD controller circuit is connected to a connector 14 for control signals. The connector 14 is mounted on the surface of the printed circuit board so as to form an interface such as IDE and SCSI standards. When a cable 15 for control signals, extending from a motherboard of the computer, is connected to the connector 14, a data transmission path can be established between the HDD controller circuit and the motherboard. The HDD controller circuit is designed to operate in response to an electric power transferred from a connector 16 for electric power. The connector 16 is designed to receive a cable 17 for electric power extending from a power supply of the computer.

Figure 2:
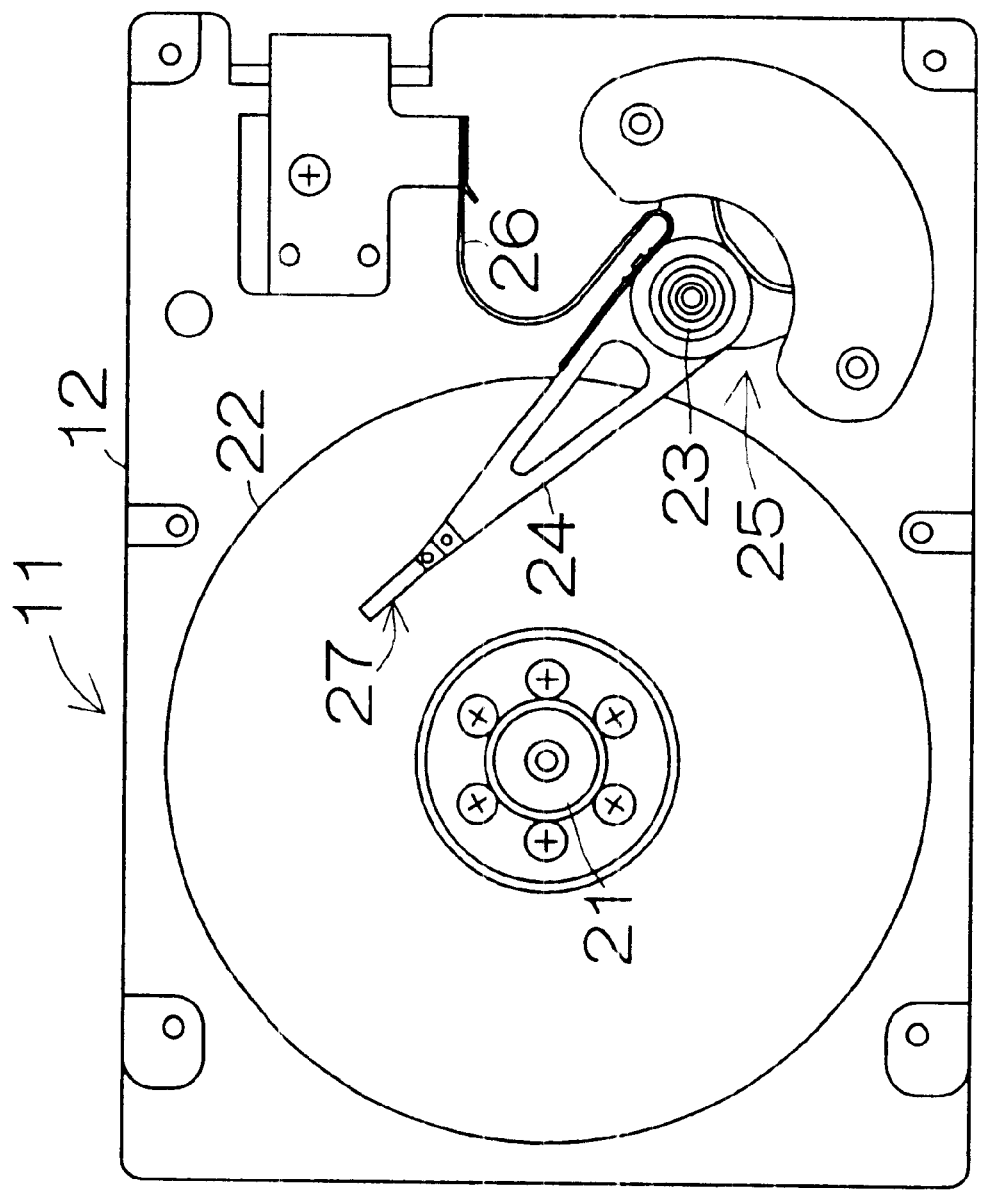
FIG. 2 is a plan view schematically illustrating the inner structure of the HDD.

As shown in FIG. 2, at least a magnetic recording medium or disk 22 is mounted on a spindle motor 21 on the up-faced surface of the base 12. The spindle motor 21 is designed to drive the magnetic disk 22 for rotation about the rotation axis. A carriage 24 is also mounted on the up-faced surface of the base 12. The carriage 24 is designed to swing about a support axis 23. An actuator 25, comprising a magnetic circuit such as a voice coil motor, serves to drive the carriage 24 for swinging movement. When the enclosure body 13 is coupled on the up-faced surface of the base 12, the magnetic disk 22 and the carriage 24 are enclosed within the air-tight enclosure space between the enclosure body 13 and the base 12.

As is apparent from FIG. 2, a flexible printed circuit board (FPC) 26 is connected to the carriage 24. The FPC 26 is designed to extend from the rear surface of the aforementioned circuit board. The FPC receives on its surface a write operation controller circuit, not shown, adapted to control the write operation of magnetic information data into the magnetic disk 22, and a read operation controller circuit adapted to control the read operation of magnetic information data out of the magnetic disk 22. The structure of the read operation controller circuit will be described later in detail.

Figure 3:
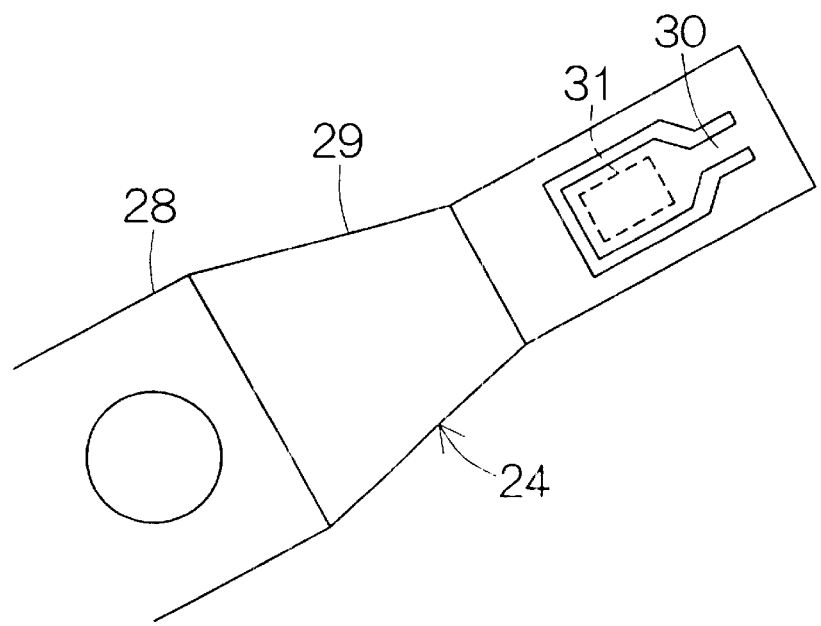
FIG. 3 is an enlarged plan view schematically illustrating the structure of the magnetic head assembly.

A magnetic head assembly 27 is supported at the tip end of the carriage 24. The magnetic head assembly 27 may comprise a rigid frame 28 fixed at the tip end of the carriage 24, and an elastic suspension 29 cantilevered on the rigid frame 28, as shown in FIG. 3, for example. A head slider 31 is fixedly mounted on the tip end of the elastic suspension 29 with a gimbals spring 30 interposed therebetween. The head slider 31 is opposed to the surface of the magnetic disk 22. When the magnetic disk 22 is driven for rotation so as to generate an airflow along the surface of the magnetic disk 22, the head slider 31 receives the airflow so as to fly above the surface of the magnetic disk 22. When the magnetic disk 22 stands still, the elastic force of the elastic suspension 29 serves to urge the head slider 31 against the surface of the magnetic disk 22.

As conventionally known, a thin film inductive head element, not shown, is mounted on the head slider 31. The thin film inductive head element is designed to achieve the write operation of magnetic information data to the magnetic disk 22 when the head slider 31 keeps flying. In addition, a magnetoresistive (MR) head element is mounted on the head slider 31 so as to likewise achieve the read operation of magnetic information data from the magnetic disk 22 when the head slider 31 keeps flying. Metallic conductive wiring patterns, not shown, are formed on the carriage 24, the frame 28 and the elastic suspension 29 so as to establish signal transmission paths between the aforementioned write and read operation controller circuits and the thin film inductive and MR head elements, respectively. As is apparent from FIG. 2, when the carriage 24 is driven to swing, the head slider 31 is allowed to cross recording tracks on the magnetic disk 22 in the radial direction of the magnetic disk 22. Such movement of the head slider 31 serves to position the thin film inductive and MR head element right on a target recording track during the write and read operations. It should be noted that a thin film coil pattern can be employed to generate a magnetic flux or field in the thin film inductive head element, while a giant magnetoresistive (GMR) or a tunnel junction magnetoresistive (TMR) head element can be employed as the MR head element.

Figure 4:
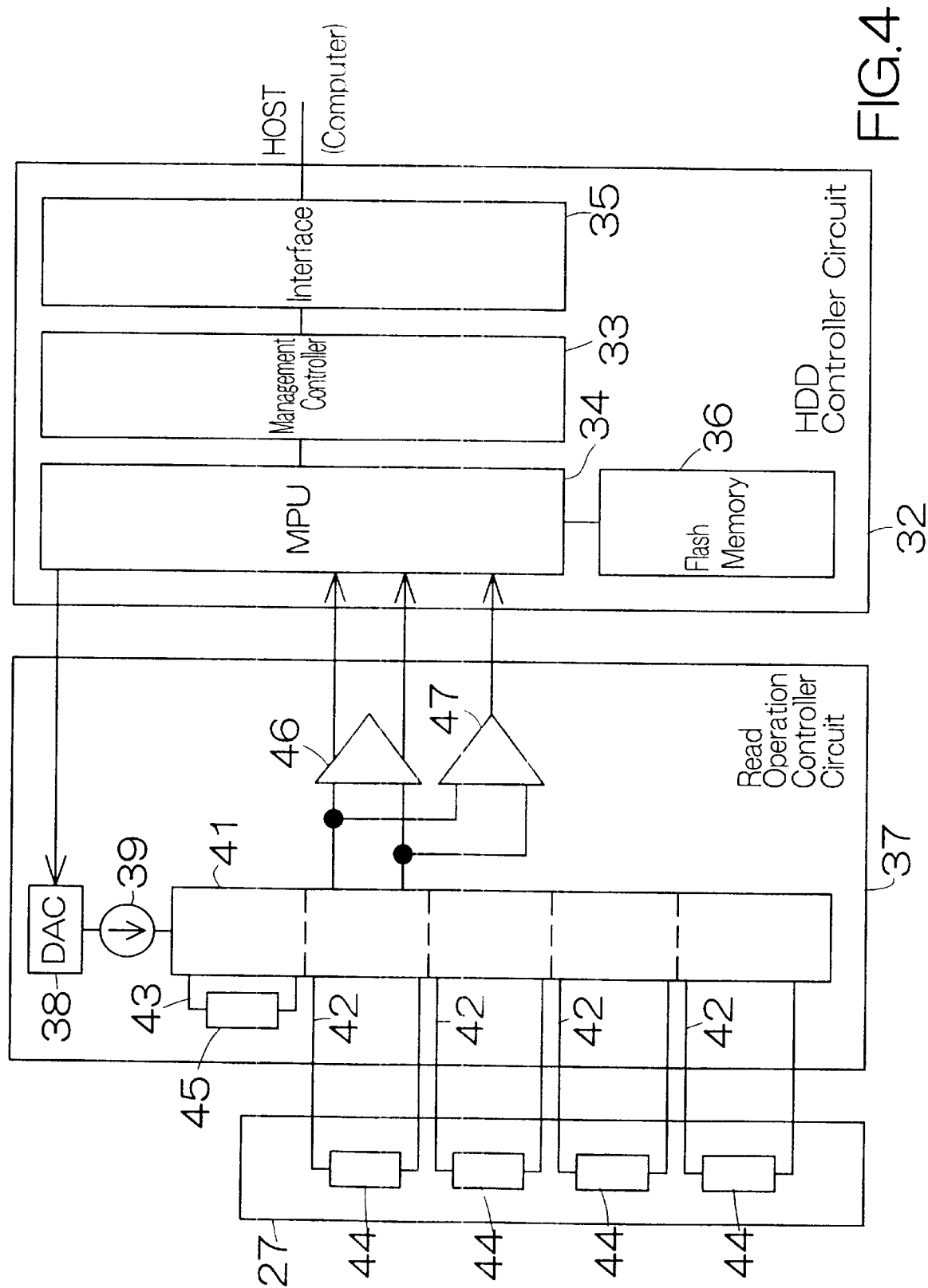
FIG. 4 is a block diagram schematically illustrating the structure of an HDD controller circuit.

Here, the aforementioned HDD controller and read operation controller circuits will be described in detail. As shown in FIG. 4, the HDD controller circuit 32 comprises a management controller 33 designed to manage a generic operation of the HDD 11, and a micro processing unit (MPU) 34 designed to control the read operation of magnetic information data to the magnetic disk 22 with the assistance of the management controller 33, for example. The management controller 33 is connected to the connector 14 through an interface 35. A flash memory 36 is connected to the MPU 34. The MPU 34 is designed to process specific operations in line with a firmware and data stored in the flash memory 36 so as to achieve the read operation.

The read operation controller circuit 37 comprises a digital/analog converter (DAC) 38 designed to convert digital signals from the MPU 34 into analog signals, and a current source 39 designed to output an electric current of a value specified by the analog signal from the DAC 38. The output electric current is supplied to a bias circuit 41 connected to the current source 39.

First and second sense channels 42, 43 are connected in parallel to the bias circuit 41, respectively. The aforementioned MR head elements 44 in the magnetic head assembly 27 are respectively connected to the corresponding first sense channels 42. A resistor 45 is connected to the second sense channel 43. The bias circuit 41 is designed to select one of the first and second sense channels 42, 43. The electric current from the current source 39 is supplied to the selected one of the first and second sense channels 42, 43. It should be noted that the first and second sense channels 42, 43 need not be distinguished from each other. A subsidiary of the first sense channels 42 may be employed as the second sense channel 43 in this case. A wire-wound resistor can be employed as the resistor 45.

First and second amplifiers 46, 47 are connected to the bias circuit 41. The first amplifier 46 is designed to amplify the variation in the voltage appearing at the first and second sense channels 42, 43 in response to the supplied electric current. The second amplifier 47 is likewise designed to amplify the potential difference appearing at the first and second sense channels 42, 43 in response to the supplied electric current. After the amplification at the first amplifier 46, the variation in the voltage is transmitted, as information data signals, to the MPU 34 in the HDD controller circuit 32.

After the amplification at the second amplifier 47, the potential difference is transmitted, as voltage value signals, to the MPU 34.

Next, description will be made on the operation of the HDD 11. Assume that an instructions signal is issued for the read operation. The management controller 33 starts driving the magnetic disk 22 for rotation. The MPU 34 is immediately operated to appoint the target MR head element 44 specified by the instructions signal. The bias circuit 41 is adapted to select the first sense channel 42 leading to the appointed MR head element 44. A path for an electric current is thus established to connect the current source 39 to the appointed MR head element 44.

Subsequently, the MPU 34 is operated to obtain an electric current value information (data) specifying the magnitude or value of the sense current. The electric current value information may be stored in the flash memory 36. The electric current value information serves to specify a specific value of the electric current for the individual MR head element 44. The specific value is determined depending on the resistance of the individual MR head element 44, as described later in detail. The MPU 34 supplies an instructions signal specifying the specific value of the electric current to the DAC 38. The DAC 38 is designed to output an analog signal specifying the specific value included in the instructions signal from the MPU 34. The current source 39 is allowed to generate an electric current of the specific value specified by the analog signal.

The electric current from the current source 39, in other words, the sense current is supplied to the appointed MR head element 44 through the selected first sense channel 42. The resistance of the appointed MR head element 44 varies in response to the change in the orientation of magnetic flux or fields formed along the surface of the magnetic disk 22. The variation in voltage accordingly appears at the first sense channel 42. After the amplification at the first amplifier 46, the variation in voltage is transmitted to the MPU 34. In this manner, the magnetic information data is read out of the magnetic disk 22.

Now, assume that the resistance is to be measured for the individual MR head elements 44 in determining the specific magnitude or value of the sense current. The measurement can be conducted in a factory after completion of assembly of the HDD 11, for example. The MPU 34 may be adapted to start the measurement in response to instructions signals input through the interface 35 by an operator. The MPU 34 is allowed to operate in line with the input instructions signals.

First of all, the MPU 34 is designed to supply an instructions signal specifying a first value $I_1$ of an electric current to the DAC 38. The first value $I_1$ may be set at 2 mA, for example. The DAC 38 outputs an analog signal specifying the first value $I_1$ in response to the instructions signal. The current source 39 outputs a first provisional inspection current of the first value $I_1$ to the bias circuit 41.

The first provisional inspection current is supplied to the second sense channel 43 connected to the resistor 45. The second amplifier 47 amplifies the potential difference or voltage appearing at the second sense channel 43. The MPU 34 detects the value $V_{BHV1}$ of a first output voltage from the second amplifier 47. The operator is allowed to take out the value $V_{BHV1}$ of the first output voltage through the interface 35.

Subsequently, the MPU 34 is designed to supply an instructions signal specifying a second value $I_2$, different from the first value $I_1$, of an electric current to the DAC 38. The second value $I_2$ may be set at 5 mA, for example. The DAC 38 outputs an analog signal specifying the second value $I_2$ in response to the instructions signal. The current source 39 outputs a second provisional inspection current of the second value $I_2$ to the bias circuit 41.

The second provisional inspection current is again supplied to the second sense channel 43 connected to the resistor 45. The second amplifier 47 amplifies the potential difference or voltage appearing at the second sense channel 43 this time. The MPU 34 detects the value $V_{BMV2}$ of a second output voltage from the second amplifier 47. The operator is allowed to take out the value $V_{BHV2}$ of the second output voltage through the interface 35. When the first and second values $V_{BHV1}$ and $V_{BHV2}$ have been measured, the amplification characteristic, namely, the gain of the second amplifier 47 can be determined based on the value corresponding to the resistance of the resistor 45 and the first and second values $V_{BHV1}$ and $V_{BHV2}$ of electric currents, as described later.

Thereafter, the MPU 34 outputs an instructions signal specifying a third value $I_{MR}$ of an electric current to the DAC 38. The DAC 38 outputs an analog signal specifying the third value $I_{MR}$ in response to the instructions signal. The current source 39 outputs an inspection current of the third value $I_{MR}$ to the bias circuit 41.

The inspection current is supplied to one of the first sense channel 42. The second amplifier 47 amplifies the potential difference or voltage appearing at the first sense channel 42. The MPU 34 detects the value $V_{BHV}$ of an output voltage for inspection from the second amplifier 47. The operator is allowed to take out the value $V_{BHV}$ of the output voltage for inspection through the interface 35. The inspection current is sequentially supplied to the individual MR head elements 44. The values $V_{BHV}$ of the output voltages for inspection are obtained for the individual MR head elements 44 in this manner.

The operator is allowed to get the third value $I_{MR}$ of the inspection current supplied to the individual MR head elements 44, as well as the values $V_{BHV}$ of the output voltages from the second amplifier 47 in response to the inspection currents in the above-described manner. The resistance $R_{MR}$ of the individual MR head elements 44 can be calculated in accordance with the following expression:

$$R_{MR} = \frac{(V_{BHV} - \beta)}{\alpha} \cdot \frac{1}{I_{MR}} = \left(\frac{V_{BHV}}{\alpha} - V_{OFF}\right)\frac{1}{I_{MR}} \quad (1)$$

Here, constants $\alpha$ and $\beta$ in the above equation can be expressed as follows, referring to the resistance $R_{RE}$ of the resistor 45, the first and second values $I_1$, $I_2$, and the values $V_{BHV1}$, $V_{BHV2}$ of the first and second output voltages:

$$\alpha = \frac{1}{R_{RE}} \cdot \frac{(V_{BHV2} - V_{BHV1})}{(I_2 - I_1)}$$

$$\beta = V_{BHV1} - \alpha I_1 R_{RE} = V_{BHV2} \alpha I_2 R_{RE} \quad (2)$$

The constant $V_{OFF}$ thus be obtained according to the following expression:

$$V_{OFF} = \frac{\beta}{\alpha} = \frac{V_{BHV1}}{\alpha} - I_1 R_{RE} = \frac{V_{BHV2}}{\alpha} - I_2 R_{RE} \quad (3)$$

In this manner, the resistance $R_{MR}$ can be determined for the individual MR head elements 44. The values for the sense current can be determined for the individual MR head elements 44 in line with the determined resistance $R_{MR}$. The determined values may be stored in the flash memory 36 by manipulation by the operator, or the like. The flash memory 36 is thus designed to store the electric current value information.

Figure 5:
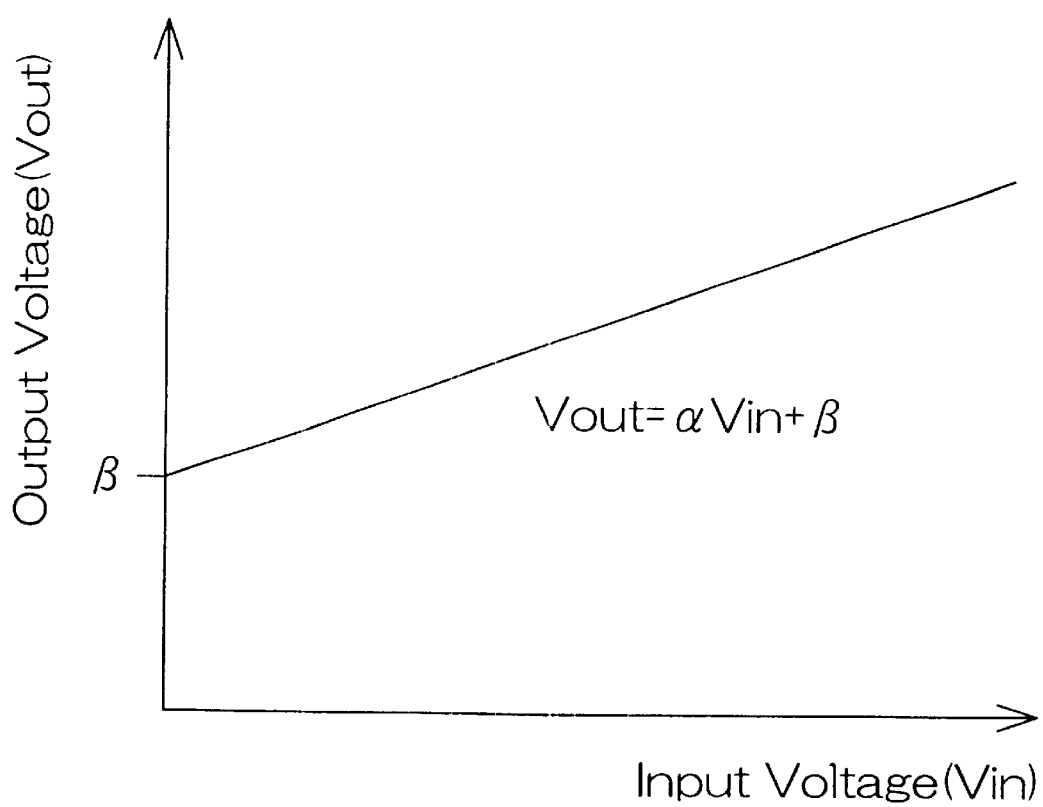
FIG. 5 is a graph expressing the concept of the gain for a second amplifier for inspection.

Here, the amplification characteristic will be considered for the second amplifier 47. Such amplification characteristic can be represented by the effective gain of the second amplifier 47. The effective gain may be expressed by a linear function, as shown in FIG. 5, for example.

$$V_{OUT} = \alpha V_{IN} + \beta \quad (4)$$

Assume that the second amplifier 47 outputs the above-identified values $V_{BHV1}$, $B_{HV2}$ of the first and second output voltages in response to input voltages of the values $B_{HV1}$, $B_{HV2}$ appearing at terminals of the resistor 45, respectively. The following relationship can be established:

$$V_{BHV1} = \alpha V_{RE1} + \beta = \alpha I_1 R_{RE} + \beta$$
$$V_{BHV2} = \alpha V_{RE2} + \beta = \alpha I_2 R_{RE} + \beta \quad (5)$$

The values $V_{BHV1}$, $V_{BHV2}$ of the input voltages can be obtained by calculation based on the resistance $R_{RE}$ of the resistor 45 and the first and second values $I_1$, $I_2$, of the electric currents, respectively. The aforementioned expression (2) can be obtained by solving the above simultaneous equation (5). When the constants α and β of the expression (4) are substituted by the expression (2), the effective gain can be determined for the second amplifier 47. In this manner, the effective gain of the second amplifier 47 can be measured at a higher accuracy.

In general, it is impossible to set the amplification characteristic or gain at a higher accuracy in an amplifier, such as the second amplifier 47, for amplifying a smaller and weaker potential difference or voltage. The effective gain of the amplifier slightly departs from the ideal gain actually required. The actual measurement of the effective gain in the above-described manner leads to determination of the effective gain for the second amplifiers 47 of the individual HDDs 11.

As conventionally known, the amplification characteristic or gain of the second amplifier 47 may be specified by the ratio of the output voltage $V_{OUT}$ to the input voltage $V_{IN}$. If the gain of the second amplifier 47 can be expressed by a linear function as described above, an offset value β inevitably included in the gain can be taken into account in determining the effective gain. The effective gain can be determined at a still improved accuracy.

Assume that the second amplifier 47 of the aforementioned effective gain outputs an output voltage of the value $V_{BHV}$ for inspection in response to an input voltage of the value $V_{MR}$ appearing at terminals of the MR head element 44. The following relationship can be established:

$$V_{BHV} = \alpha V_{MR} + \beta \quad (6)$$

or $$V_{MR} = \frac{V_{BHV} - \beta}{\alpha} \quad (7)$$

The electric current of the value $I_{MR}$ and the voltage of the value $V_{MR}$ is expected to establish the following relationship in the MR head element 44:

$$R_{MR} = \frac{V_{MR}}{I_{MR}} \quad (8)$$

Accordingly, the following equation can be established:

$$R_{MR} = \frac{(V_{BHV} - \beta)}{\alpha} \cdot \frac{1}{I_{MR}} = \left(\frac{V_{BHV}}{\alpha} - V_{OFF}\right)\frac{1}{I_{MR}} \quad (1)$$

In this manner, the employment of the above-described accurate gain in calculation leads to improvement in determination of the value $R_{MR}$ of the resistance for the respective MR head elements 44. The calculated value $R_{MR}$ enables determination of the maximum permissible magnitude of an electric current for the MR head element 44 at a higher accuracy. It is accordingly possible to set the sense current maximized within the range below the true maximum permissible magnitude of an electric current for the respective MR head elements 44.

In determining the value of the sense current, the MPU 34 may be designed to operate in accordance with a computer program, namely, a firmware stored in the flash memory 36. In this case, the MPU 34 is operated to detect the values $V_{HBV1}$, $V_{BHV2}$ of the first and second output voltages appearing at the second amplifier 47 based on the provisional inspection currents of the first and second values $I_1$, $I_2$. The first and second values $I_1$, $I_2$ may be stored in advance in the flash memory 36.

Subsequently, the MPU 34 is operated to calculate the constants α a and β in accordance with the expression (2) based on the measured values $V_{HBV1}$, $V_{BHV2}$ of the first and second output voltages. In calculation, the MPU 34 is designed to refer to the first and second values $I_1$, $I_2$ and the resistance $R_{RE}$ of the resistor 45, which may be stored in the flash memory 36. The constants α and β serve to determine the amplification characteristic or gain of the amplifier at a higher accuracy.

Thereafter, the MPU 34 is operated to detect the value $V_{HBV}$ of an output voltage appearing at the second amplifier 47 based on the inspection current of the third value $I_{MR}$, in the above-described manner. After measurement of the output voltage in response to supply of the inspection current, the MPU 34 is operated to calculate the resistance $R_{MR}$ of the individual MR head element 44 in accordance with the aforementioned expression (1). The third value $I_{MR}$ may be fetched from the flash memory 36.

When the resistance $R_{MR}$ has been calculated, the MPU 34 is operated to determine the value of a sense current suitable to the calculated resistance $R_{MR}$ in accordance with a referential table stored in the flash memory 36. The referential table may include, as shown below, the values of sense current for specific ranges of the resistance $R_{MR}$.

TABLE 1

| Resistance $R_{MR}$ [Ω] | Sense Current [mA] |
|---|---|
| 40–50 | 3.0 |
| 50–60 | 2.4 |
| 60–70 | 2.0 |

The operations of the MPU 34 may be achieved every time the HDD 11 is turned on, for example.

What is claimed is:

1. A method of measuring a resistance of a magnetoresistive element, comprising:
    supplying an inspection current to a resistor connected to a sense channel, said inspection current taking first and second values;

measuring a value of an output voltage from an amplifier for amplifying a potential difference appearing at the sense channel in response to supply of the inspection current of the first and second values, respectively; and calculating an amplification characteristic of the amplifier based on the value of the output voltage and a value of the inspection current.

2. The method according to claim 1, further comprising executing said determination of the amplification characteristic of the amplifier prior to calculation of a value corresponding to the resistance of the magnetoresistive element connected to the sense channel.

3. A read operation controller circuit comprising:

a plurality of sense channels;

a current source designed to output an electric current of a specified value;

a bias circuit interposed between the sense channels and the current source, said bias circuit designed to appoint any of the sense channels so as to supply the electric current from the current source to said any of the sense channels; and a resistor connected to the bias circuit in parallel with the sense channels, said resistor having a predetermined resistance value.

4. A magnetic medium drive comprising:

a first sense channel;

a magnetoresistive element connected to the first sense channel;

a second sense channel extending in parallel with the first sense channel;

a resistor connected to the second sense channel in parallel with said magnetoresistive element, said resistor having a predetermined resistance value;

a current source designed to output an electric current of a specified value;

a bias circuit connected to the first and second sense channels so as to selectively supply the electric current from the current source to the first and second sense channels; and an amplifier connected to the first and second sense channels so as to amplify a potential difference appearing at the first and second sense channels in response to supply of the electric current from the current source.

5. A computer-readable storage medium which contains program instructions, comprising:

computer program code causing a processor to appoint a sense channel connected to a resistor;

computer program code causing a processor to cause supply of a first inspection current of a first value to the sense channel;

computer program code causing a processor to obtain a first value of an output voltage from an amplifier designed to amplify a potential difference appearing at the sense channel in response to supply of the first inspection current;

computer program code causing a processor to cause supply of a second inspection current of a second value different from the first value to the sense channel;

computer program code causing a processor to obtain a second value of an output voltage from the amplifier in response to supply of the second inspection current; and computer program code causing a processor to calculate an amplification characteristic of the amplifier based on a value corresponding to a resistance of the resistor, the first and second values of the first and second inspection currents and the first and second values of the output voltages.

* * * * *